Feb. 8, 1949.  J. A. CHAMBERS  2,461,197
DISPENSING MACHINE

Filed Nov. 9, 1945  9 Sheets-Sheet 1

INVENTOR.
J. A. CHAMBERS
BY
Wilkinson + Mawhinney
ATTORNEYS

Feb. 8, 1949.  J. A. CHAMBERS  2,461,197
DISPENSING MACHINE

Filed Nov. 9, 1945   9 Sheets-Sheet 4

INVENTOR.
J.A. CHAMBERS
BY
Wilkinson & Mawhinney
ATTORNEYS

Feb. 8, 1949. J. A. CHAMBERS. 2,461,197
DISPENSING MACHINE
Filed Nov. 9, 1945 9 Sheets-Sheet 6

INVENTOR.
J. A. CHAMBERS
BY
Wilkinson & Mawhinney
ATTORNEYS

Feb. 8, 1949.    J. A. CHAMBERS    2,461,197
DISPENSING MACHINE
Filed Nov. 9, 1945    9 Sheets-Sheet 7

Inventor
J. A. CHAMBERS
By Wilkinson & Mawhinney
Attorneys

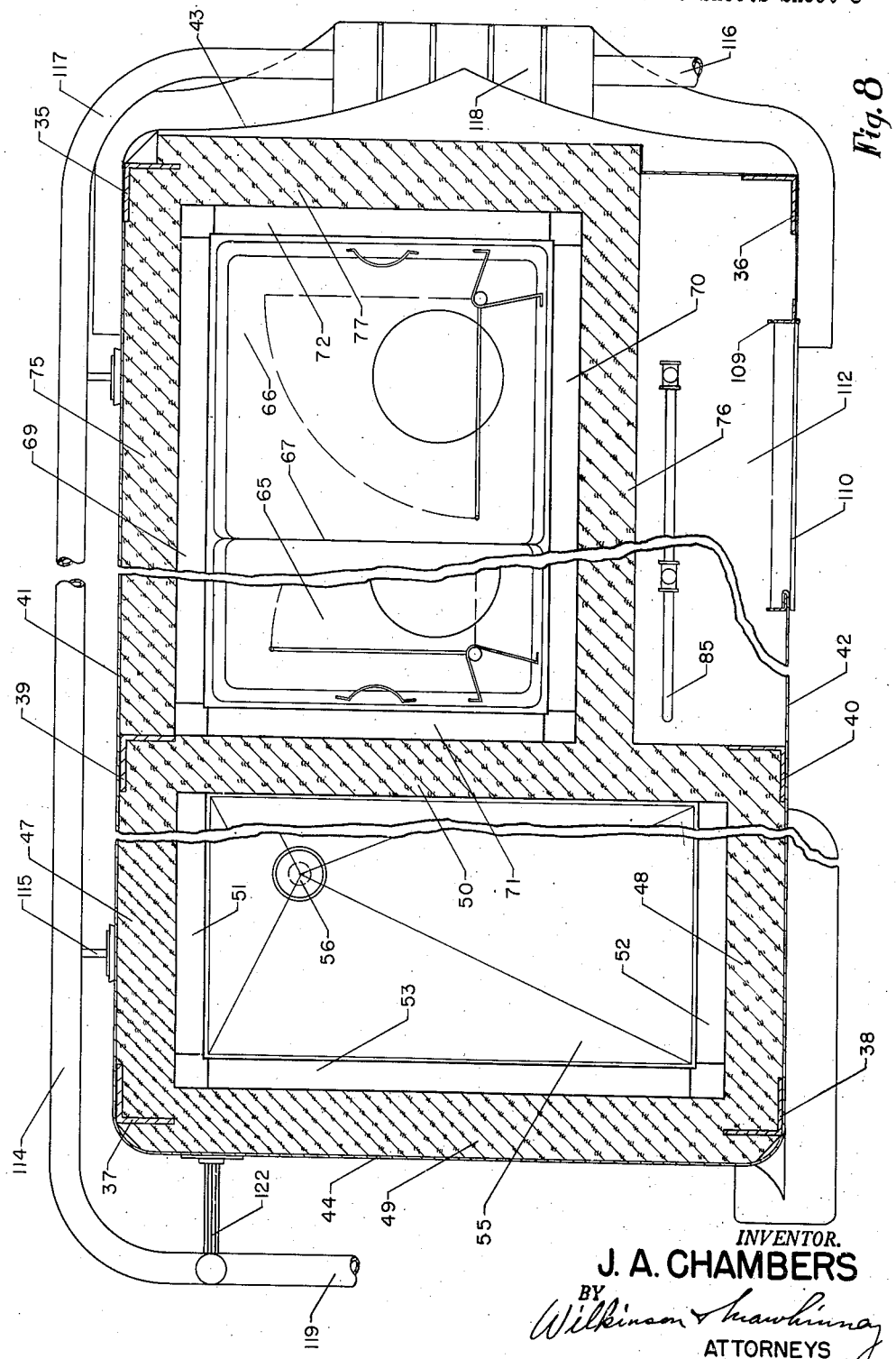

Feb. 8, 1949.  J. A. CHAMBERS  2,461,197
DISPENSING MACHINE
Filed Nov. 9, 1945  9 Sheets-Sheet 9
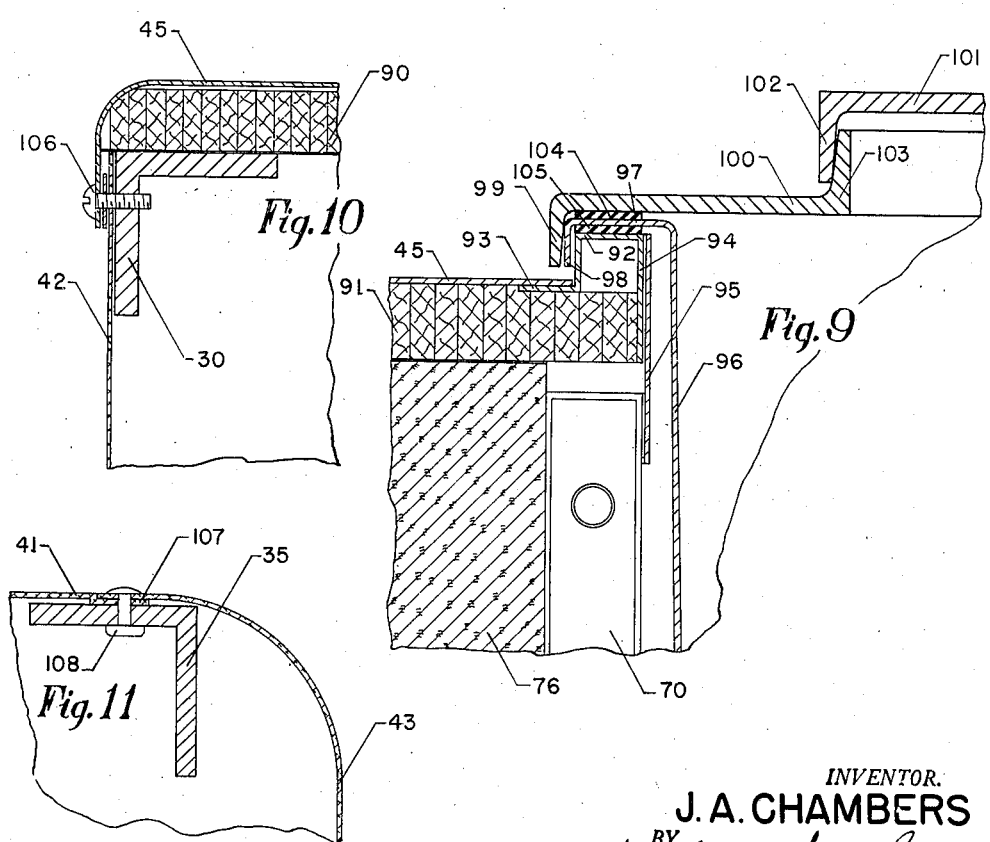
INVENTOR.
J. A. CHAMBERS
BY Wilkinson Mawhinney
ATTORNEYS Patented Feb. 8, 1949

2,461,197

UNITED STATES PATENT OFFICE 2,461,197

DISPENSING MACHINE

Joseph A. Chambers, Memphis, Tenn.

Application November 9, 1945, Serial No. 627,712

2 Claims. (Cl. 62—89)

The present invention relates to improvements in dispensing machines and has for an object the dispensing of beverages and the storing and selling of package ice cream and the like.

Another object of the machine is to provide a mobile dispensing machine so constructed and arranged that it may be serviced by a single attendant and pushed about from place to place by the same attendant for the purpose of the distribution and sale of bottled and fountain soft drinks, ice cream and the like.

A further object of the invention is to provide a transportable machine for the dispensing and vending of fountain drinks, ice cream and the like in which the various units are compactly assembled into a unitary vehicular machine to bring all such units within small compass not only for the embodiment of the same as separate integers in a composite vehicle, but also to aid in the prompt service of the beverages and ice cream due to the fact that such units are closely assembled for quick and easy access by a single attendant.

A still further object of the invention resides in the provision of a vehicular fountain and ice cream storage receptacles in which the mobile character of the apparatus is screened and largely secreted and the device as a whole given an appearance of a stable and installed bar or soda fountain and in which further provision is made for the protection of the side walls and included refrigerating units and other parts which are susceptible to damage from collision with other vehicles in encountering the hazards of vehicular traffic.

With the foregoing and other objects in view the invention will be fully described hereinafter and more fully pointed out in the appended claims.

In the drawings, in which like parts are denoted by the same reference characters throughout the several views, Figure 1 is a side elevational view of an improved dispensing machine constructed in accordance with the present invention.

Figure 8 is a horizontal section taken on the line 8—8 of Figure 4.

Figure 9 is a vertical section taken on the line 9—9 of Figure 7.

Figure 10 is also a vertical section taken on the line 10—10 in Figure 7.

Figure 11 is a fragmentary horizontal section taken through a corner portion of the framework on an enlarged scale.

Referring more particularly to the drawings, the machine comprises generally a wheeled chassis, a superstructure thereon and a body carried on the superstructure in which is contained the compartments and receptacles for the ice cream and the beverage syrups.

Figure 4:
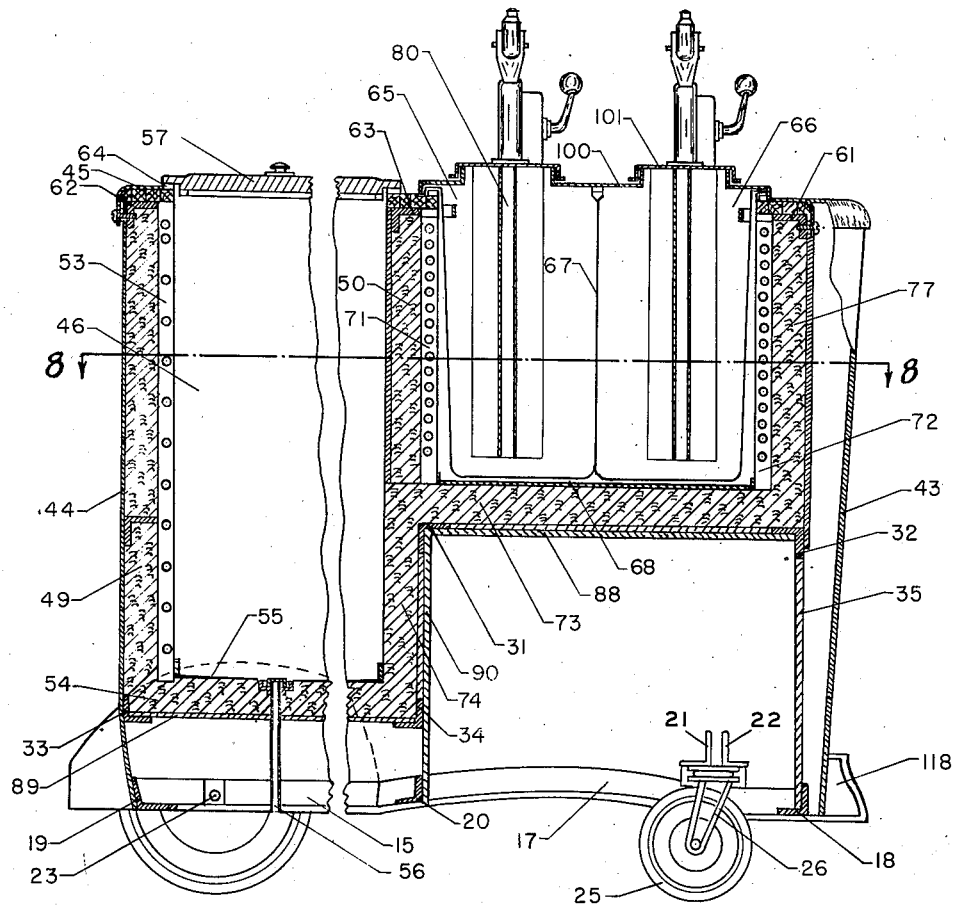
Figure 4 is a longitudinal sectional view taken on the line 4—4 of Figure 3.
Figure 5:
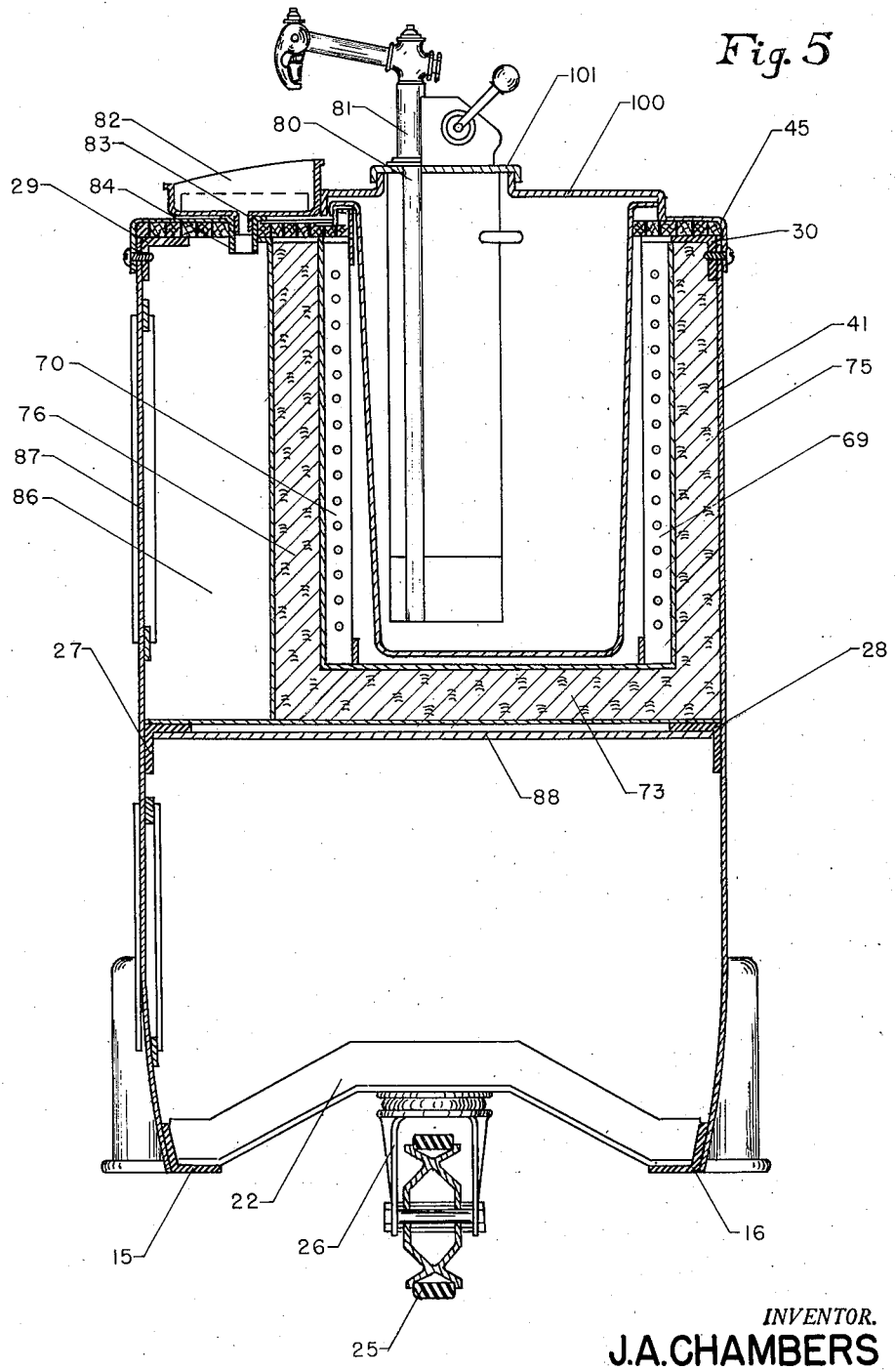
Figure 5 is a transverse vertical section taken on the line 5—5 in Figure 1.

The chassis is composed generally of two longitudinal rails or beams 15 and 16 which are spaced apart and arranged in substantial parallelism. Such beams or rails and the other beams or rails composing the chassis and superstructure are made advantageously of angle iron in cross section. As shown in Figure 5 the horizontal webs of the longitudinal beams 15 and 16 are turned inwardly with the vertical webs turned upwardly in such wise that these longitudinal beams 15 and 16 are peculiarly located and arranged to receive therein the transverse beams 18, 19 and 20. As shown in Figure 4, the longitudinal beams 15 and 16 are preferably arched upwardly at their forward portions as indicated at 17.

Also referring to Figure 4 the front and rear transverse beams 18 and 19 are at the extreme front and rear portions of the machine, have their horizontal webs downward and disposed inwardly of the machine and with their vertical webs outwards. The intermediate transverse rail or beam 20 is located on the arch 17 and at the rear portion of this arch and preferably has its webs disposed as illustrated in Figure 4. The transverse rails are welded or otherwise affixed to the longitudinal beams 15 and 16.

As shown to best advantage in Figure 4, a double transverse beam 21, 22 is shown at the forward portion of the chassis and just rearwardly of the forward transverse beam 18. The double transverse beam has its vertical webs separated and its horizontal webs mutually turned outwardly away from one another to better receive the swivel platform or turntable 26 which carries the caster wheel 25, which as shown in Figure 5 is the single and sole wheel that supports the forward portion of the machine, and is arranged centrally of the longitudinal median line of the machine with its platform and kingpin disposed beneath an upwardly displaced central portion of the double transverse beams 21, 22.

At the rear the machine is supported upon two rear wheels 24 journaled upon the rear stub axles 23 which are appropriately mounted in the longitudinal beams 15 and 16 or in other parts of the chassis framework.

The above parts constitute generally the wheeled chassis upon which the superstructure and body is mounted.

The superstructure comprises an openwork frame of longitudinal, transverse and vertical beams, of which 27 and 28 (Fig. 5) form the lower longitudinal beams and 29 and 30 the upper pair of longitudinal beams; both sets of beams having the horizontal webs thereof disposed upwardly and inwardly and the vertical webs extending downwardly at the outer side lines of the machine.

As appears in Figure 5 a forward pair of transverse beams 32 are mounted between the longitudinal beams 27 and 28 and welded or otherwise affixed thereto in such position that the beam 31 is approximately above the beam 20 and the beam 32 spaced above the forward transverse chassis beam 18. A rear pair of transverse beams 33 and 34 are disposed respectively above the chassis transverse beams 19 and 20. These transverse beams are welded or otherwise secured to sets of vertical beams shown more particularly in Figure 8 as composing a pair of front vertical beams 35, 36, a pair of rear vertical beams 37, 38 and a pair of intermediate beams 39, 40. The webs of these vertical beams are preferably disposed as shown in Figure 8.

These vertical beams are also welded or otherwise secured to the top transverse beams 61, 62 and 63 (Fig. 4).

The superstructure as above described is adapted to receive the body which is composed generally of sheet metal side walls, front and rear walls, a top with ice cream and beverage compartments therein, combined with refrigerating equipment.

The sheet metal side walls of the body are indicated at 41 and 42, the front wall at 43, the rear wall at 44 and the top wall at 45. An ice cream compartment 46 may extend substantially the full width of the machine at the rear portion thereof as shown in Figure 8 and substantially vertically deep as shown in Figure 4 with the bottom of the compartment 46 extending down to the transverse supporting beams 34 which are a low level as compared with the forward pair of transverse beams 31 and 32.

The ice cream compartment is enclosed by lateral heat-insulating walls 47 and 48, by a front insulating wall 49 and a rear insulating wall 50. Within this compartment 46 and within its insulated walls are removably or otherwise mounted panels of refrigerating coils 51, 52 and 53, which are preferably disposed in the sides and rear of this ice cream compartment 46.

As shown in Figure 4, a heat-insulating bottom wall 54 is disposed below a metal bottom 55. As appears in Figure 8 the bottom 55 is sloped to a drain 56. As shown in Figure 4, this drain extends down to a low point of the machine.

Figure 6:
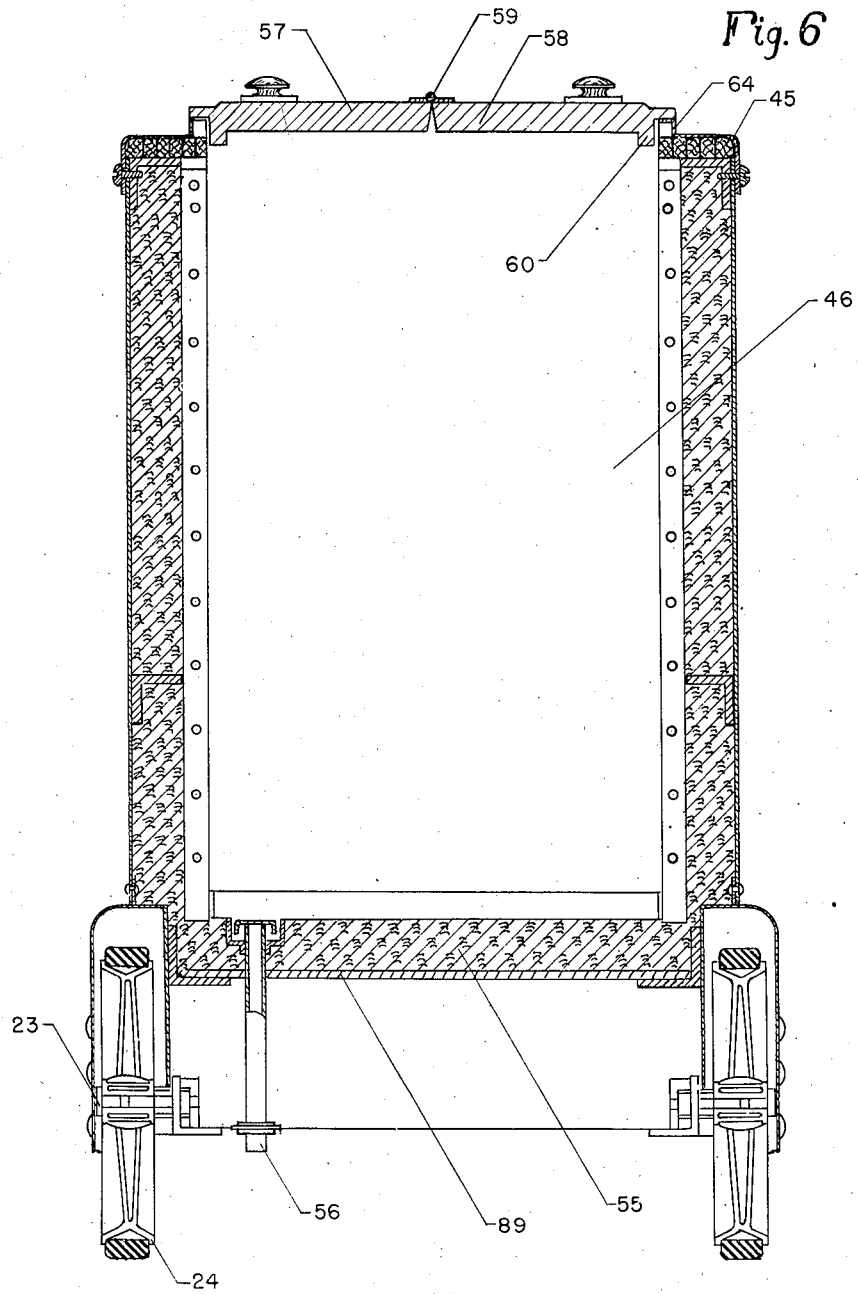
Figure 6 is a similar view taken on the line 6—6 also in Figure 1.

The ice cream compartment 46 is accessible through its upper end which opens through the top wall 45 of the body. A cover normally closes such opening. This cover is more particularly shown in Figures 6 and 7 as comprising two cover sections 57, 58 having appropriate knobs or handholds and being hinged together centrally at 59 to enable one section to be lifted while the other remains in position. This cover preferably has a dependent flange 60 which fits within a raised annulus 64 which upstands from the top plate 45 about the ice cream compartment 46.

Beverage syrup compartments 65, 66 are also mounted in the body of the machine in the forward portion thereof, the same being separated by a partition 67 and having a common bottom 68. Such receptacles or compartments are refrigerated by the panel coils 69, 70, 71 and 72 which lie inwardly of the heat insulating sections 75 and 76 at the sides, 77 at the front and 49 at the rear. This insulating section 49 serves both the ice cream compartment 46 and the beverage compartments 65, 66. As shown in Figure 4, a bottom heat insulating section 73 lies below the beverage compartments 65, 66. The beverage compartments are not as vertically deep as the ice cream compartment, which condition is illustrated in Figure 4 and a section 74 of insulation lies forwardly of the lower part of the ice cream compartment 46 and connects with the bottom insulation 54 and the bottom insulation 73.

Dispenser pumps 78 and 79 are provided for each beverage syrup compartment of which there may be one or any appropriate number. The syrup discharge pipes are indicated at 80, the same having delivery nozzles 81 poised above drip-pans 82 which are supported upon the stainless steel top cover 45. Such drip-pans, as shown more particularly in Figure 5, have tubular necks 83 extending downwardly from central outlets, which necks are adapted to slidably fit into tubular sleeve sections 84. These sleeve sections may connect with a copper or other drain line 85 shown in Figure 8; or the sleeve section 84 may be disposed in a drain compartment 86 accessible through a side door 87, shown in Figure 1. Containers for the drippings may be introduced through the door 87 into the compartment 86 and fit beneath the sleeve section 84.

Bulkheads 88, 89 and 90 are shown in Figure 4 as being respectively beneath the beverage compartments, the ice cream compartment and vertically arranged back of the space below the ice cream compartment.

The insulation forms a substantial lining for the sheet metal body, as indicated to best advantage in Figure 8, and upon this insulation is supported a plywood section 91 which directly supports the stainless steel top cover 45.

Referring more particularly to Figure 9, the edge of the stainless steel cover 45 adjacent the beverage compartments overlaps an outwardly extending foot flange 93 of a raised annulus 92, the inner wall 94 of which overlaps the inner edge of the plywood section 91, and is in turn overlapped by a steel cover 95 which also overlaps the upper edge of the coil section 70. The beverage container wall 96 has an outturned rim 97 overlying the annulus 92. The rim 97 has a downturned outer flange 98 lying upon the outside of the annulus 92. A downturned flange 99 of the dispenser top 100 overlaps the flange 98 and the annulus 92. The dispenser top 100 supports the dispenser pump top 101 with interfitting flanges 102 and 103 therebetween. Rubber gaskets 104 and 105 are placed one above and one below the rim 97.

Referring to Figure 10, the plywood section 91 is shown as having its upper corner portions rounded with the metal of the top plate 45 reduced conformably and brought down to completely envelope the edges of the plywood section 19 and to partly envelope the beams 29. This downturned portion of the top 45 also overlaps the body walls 42 and screws or other fastenings 106 pass through the overlapping parts and engage the beam 29.

Referring more particularly to Figure 11, a side wall 41 and the front wall 43 of the body are shown as curved at the front corner portion of the machine and as overlapped outwardly of the vertical beam 36 with the wall 41 offset at 107 with the offset portion lying behind the overlapped part of the front wall 43. A rivet or other fastening 108 passes through the overlapped parts and screws the same to the beam 36.

Figure 1:
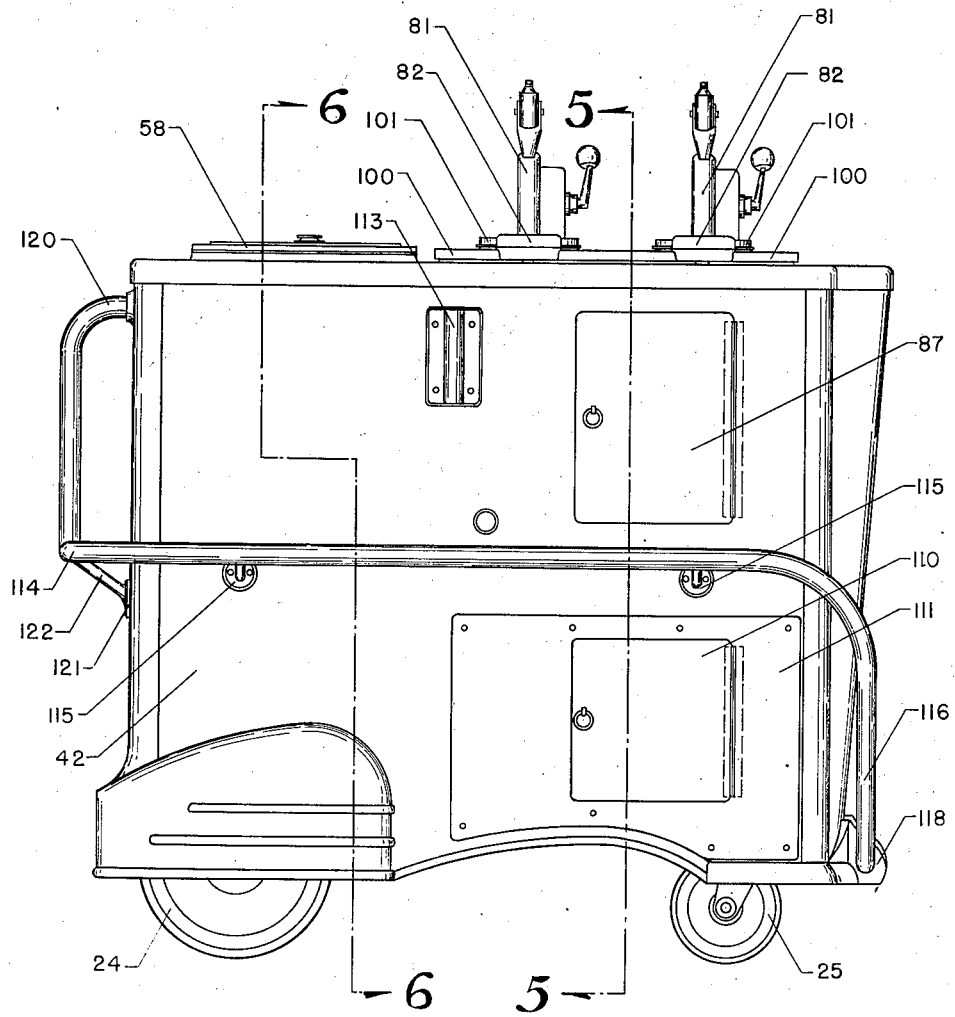

Referring more particularly to Figures 1 and 8, stiffener frame 109 for a door 110 is provided in a removable panel 111 affixed by appropriate fastenings to a side wall of the body opposite a space 112 (Fig. 4) wherein is installed a refrigeration unit for activating the various panel coils.

In Figure 1 is shown a pole socket 113 for receiving the lower end of an umbrella pole from which protection from rain and sun may be provided for the operating part of the device as well as for the attendant.

Referring more particularly to Figures 1, 2, 3 and 8, guardrails 114 are shown as extending substantially horizontally along the sides of the body about midway the height thereof and spaced from the side walls 41 and 42, being carried by such side walls by means of outriggers or outstanding brackets 115.

Figure 2:
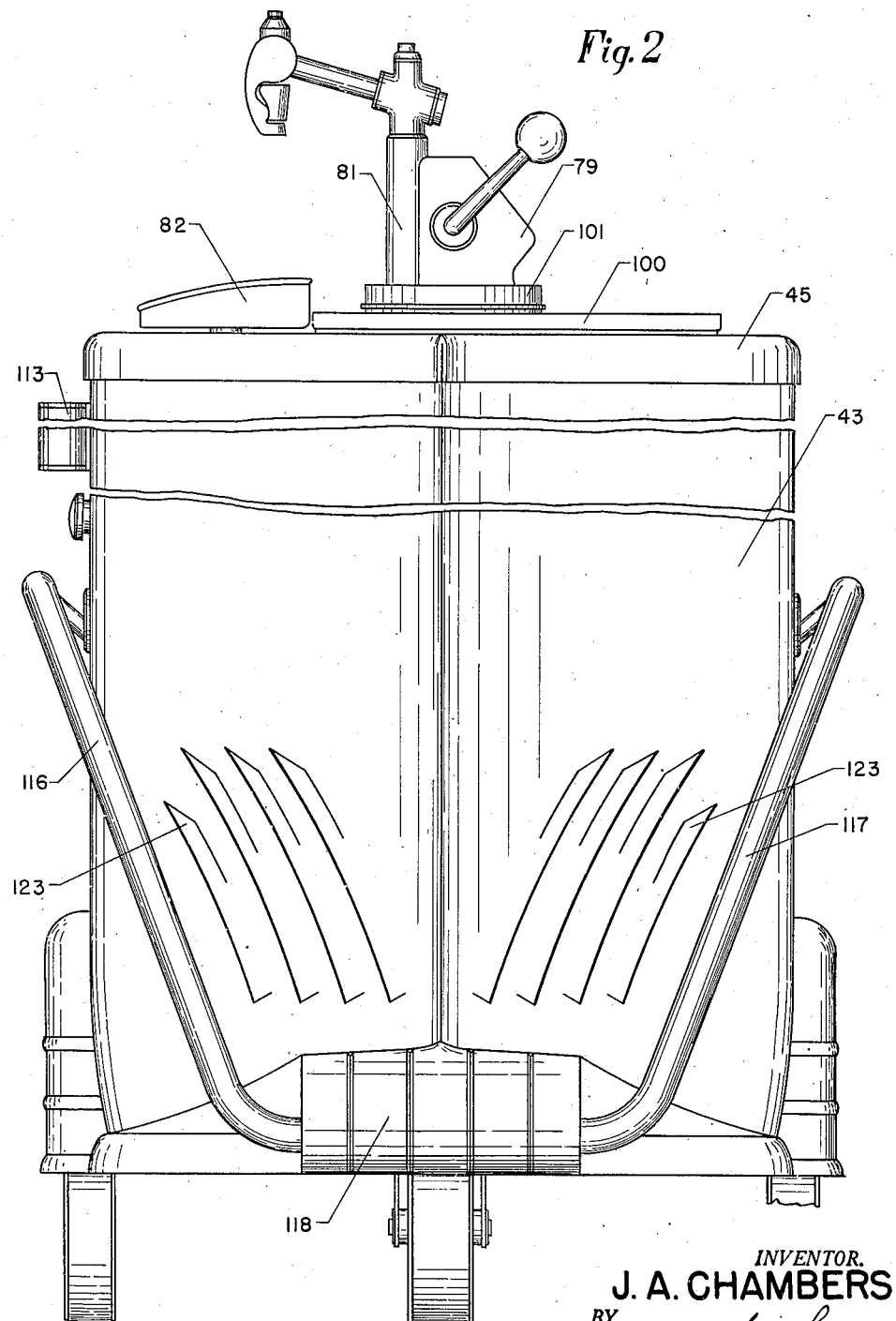
Figure 2 is a front elevation of the same.

As shown in Fig. 2, the forward ends 116 and 117 of the guardrails extend downwardly in front of the front wall 43 in convergent relation and join with the ends of a bumper 118 carried by the vehicle in the front lower portion thereof.

Figure 3:
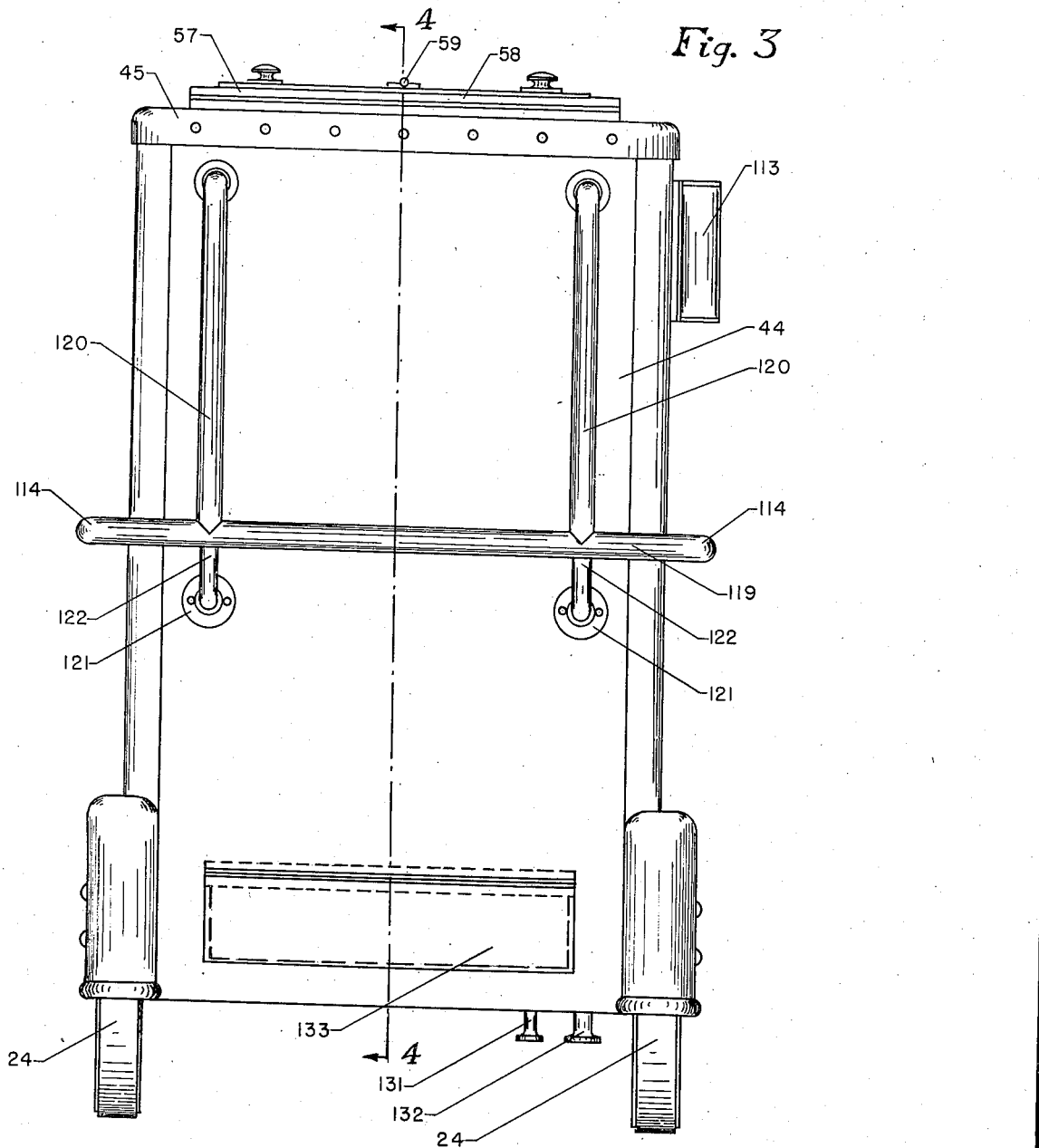
Figure 3 is a rear elevation of the improved dispensing machine.

Referring more particularly to Figure 3, a back guardrail 119 being a continuation of the rear end portions of the side guard rails 114 lies crosswise of the back wall 44 of the body, being spaced rearwardly therefrom. Handles 120 are also arranged at the back of the vehicle and their upper ends curved to the back wall 44 to which they are secured. These handles outstand from the back wall as indicated in Figure 1 and they intersect the rear guardrail 119, being preferably integral therewith. The lower ends of the handles 120 and the rear guardrail 119 are supported by brackets 121 on the rear wall 44. The shanks 122 of these brackets extend diagonally upward as shown in Figure 1.

Referring more particularly to Figure 2, louvers 123 in any suitable number may be formed in the front plate 43 in a desirable design. This front plate 43 as shown more particularly in Figure 8 is bulged out centrally to a point or prow center line and preferably the same is on a diagonal line as indicated in Figure 4. The louver slots 123 furnish cooling air to the interior of space 112 and other refrigeration unit therein.

Figure 7:
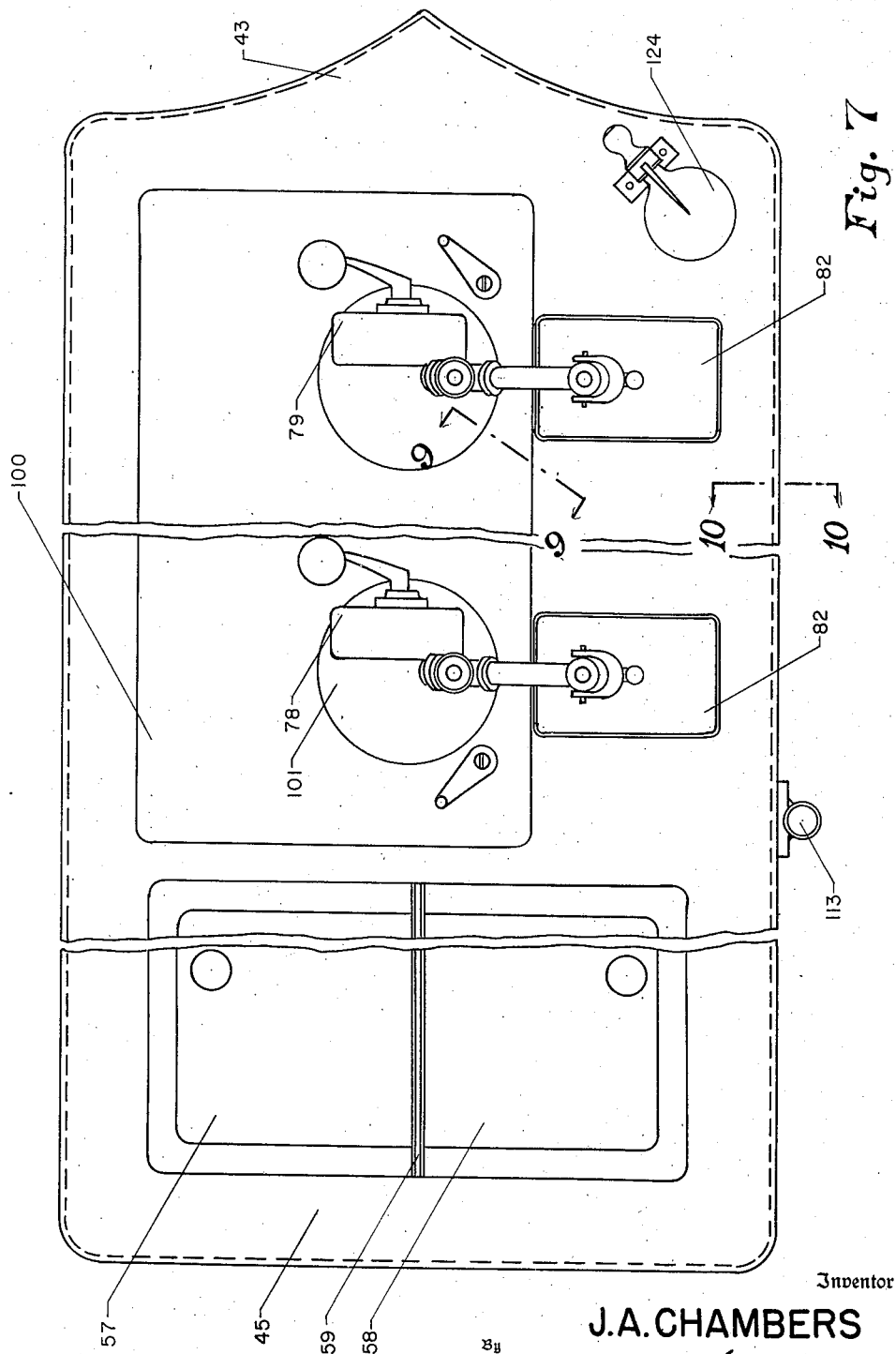
Figure 7 is a top plan view of the improved machine.

As appears in Figure 7, a cup dispenser 124 may be conveniently mounted in the top plate 45 adjacent the beverage dispensers.

In operation ice cream in package form is loaded into the compartment 46 at an ice cream manufacturing plant or central distributing point where vehicles of this character may repair from time to time for replenishment of supplies. At this point the beverage syrup tanks or compartments may also be filled with syrups of the desired or available flavors. The refrigerating unit being put in operation, the various panel coils are activated to maintain a desired low temperature in and about the various compartments such as to preserve the contents thereof in a condition for prompt sale and consumption.

The vehicle thus constructed, equipped, supplied, and operated is pushed through the streets by means of the handles 120. Many of these vehicles may operate out of a central plant or point and are easily handled by a single operator. Such operator may easily push the vehicle to a desired location. The caster wheel in front gives great flexibility in maneuvering the vehicle and in negotiating turns. When the desired location has been reached, a brake pedal 131 is pushed to apply brakes to the vehicle for maintaining it against movement. A release pedal 132 (Fig. 3) provides for releasing the brakes when the motion of the vehicle is to be resumed. In this Figure 3 is also shown a door 133 hinged to the rear wall 33 for giving access to a compartment in the ice cream compartment 46 which may be used for the storage of accessories needed in a vending business of the character involved.

The vendor makes sales of ice cream and beverages from the large supply of such merchandise afforded by the large capacity of this deep bodied vehicle with its low slung chassis. The drainage is taken care of automatically so that the appearance and sanitary condition of the vehicle is assured at all times.

This sanitation is further preserved by the device in Figures 12 and 13. By applying the hand to the thumb lift piece 130 and exerting an upward force thereupon, the arm 125 and its offset 127 may be swung from the dotted to the full line position of Figure 12 forcing the rubber or other stopper 128 into the mouth of the nozzle where it will become wedged by friction and remain closed until the thumb lift 130 is actively depressed; or the weight of the device may cause the same to gravitate to a closed position which is only opened when use is desired by the action on the part of the operator by depressing the opating piece 130.

It will be appreciated that the refrigerating unit, various compartments, coils and insulation are all grouped into relatively small compass for easy servicing and inclusion in a light weight, easily handled vehicle.

I have herein disclosed the best embodiment of the invention as known to me at this time but I reserve the right to make such changes and modifications as may fairly be construed within the meaning of the appended claims.

What is claimed is:

1. In a dispensing machine of the character described, a wheeled chassis, a deep heat-insulated body mounted upon said chassis and having compartments therein for ice cream and beverages with access openings through the top of said body, covers on the body top for closing said compartments, dispensing devices having nozzles on the top of the beverage compartments, a drain compartment in the body situated beneath and accessible to said dispensing devices and adapted to receive therein a removable container for catching the drippings from the dispensing device, a door in a side of the body for giving access to the drain compartment for the removal and replacement of such container, drip pans mounted upon the top portion of the body beneath the nozzles of the dispensing devices and having downturned tubular necks and hollow tubes for receiving such tubular necks, said hollow tubes lying through the top wall of the body and projecting downwardly into the drain compartments.

2. In a dispensing machine, a wheeled body having compartments therein opening through the top of the body, insulation in the body about said compartments, refrigerating coils lining the compartments within the insulation, a layer of plywood above the insulation, a sheet of stainless steel above said plywood having portions bent downwardly to envelop the edges of the plywood, means for securing said edges to the body below the plywood, a raised annulus joined with the sheet steel top and surrounding the openings of certain of the compartments, walls for such compartments having upper portions extending and bent outwardly above each raised annulus with a dependent flange lying in overlapping relation outwardly of each annulus, a dispenser top having a flange overlapping the flange of the compartment wall, elastic gaskets for fitting between each annulus and the container wall rim and above and between such rim and the dispenser top, and a dispenser pump top for said dispenser top.

JOSEPH A. CHAMBERS.

REFERENCES CITED

The following references are of record in the file of this patent:

UNITED STATES PATENTS

| Number | Name | Date |
|---|---|---|
| 1,558,403 | Shacikoski | Oct. 20, 1925 |
| 1,702,560 | Ebinger | Feb. 19, 1929 |
| 1,950,599 | De More | Mar. 13, 1934 |
| 1,979,549 | Huckel | Nov. 6, 1934 |
| 2,163,491 | Kauffman | June 20, 1939 |
| 2,215,511 | King | Sept. 24, 1940 |
| 2,302,051 | Phillip | Nov. 17, 1942 |